United States Patent Office 2,966,510
Patented Dec. 27, 1960

2,966,510

PREPARATION OF ACRYLIC ACID ESTERS

Jesse T. Dunn and William R. Proops, Charleston, W. Va., assignors to Union Carbide Corporation, a corporation of New York No Drawing. Filed Apr. 1, 1958, Ser. No. 725,481

5 Claims. (Cl. 260—486)

This invention relates to the production of acrylic acid esters. More particularly it is concerned with new catalysts for carrying out the interaction of acetylene, carbon monoxide and an alcohol to produce acrylic acid esters.

It is well known that acrylic acid and its esters can be produced by the reaction of acetylene and carbon monoxide with compounds having a replaceable hydrogen, such as water, alcohols, carboxylic acids, ammonia and amines, in the presence of a metal carbonyl, or other catalyst, for example, the complex triphenyl phosphine-nickel halide compounds, or the complex nickel halide-quarternary ammonium compounds.

It has now been found that the complex combinations obtained by the admixture of a nickel halide with an organic trithiophosphite are very efficient catalysts for the production of acrylic acid esters from acetylene, carbon monoxide and an alcohol at milder conditions of temperature and pressure than heretofore employed. The suitable organic trithiophosphites are also classified as organic trithiophosphine derivatives.

The catalyst complexes suitable for use as catalysts in this invention are prepared by admixing a nickel halide, such as nickel bromide, nickel fluoride, nickel chloride and nickel iodide, with an organic trithiophosphite. In preparing the complex the order of addition of the two components is immaterial.

The organic trithiophosphites useful in preparing the catalyst complexes of this invention can be represented by the following general formula:

wherein R,R' and R" represent an unsubstituted or substituted hydrocarbon radical, such as an alkyl radical containing up to about 22 carbon atoms, or more, for example, methyl, ethyl, propyl, chloropropyl, tert.butyl, methoxyethyl, 2-ethylhexyl, dodecyl, and the like, an unsubstituted or substituted aryl radical, for example, phenyl, naphthyl, chlorophenyl, nitrophenyl, and the like, an aralkyl radical, for example, benzyl, chlorobenzyl, phenethyl, dimethylbenzyl and the like, or an alkaryl radical, for example, tolyl, chlorotolyl, xylyl and the like.

Illustrative of the organic trithiophosphites which are suitable for use in this invention there may be mentioned triethyl trithiophosphite, tributyl trithiophosphite, tri-(2-ethylhexyl) trithiophosphite, triphenyl trithiophosphite, tribenzyl trithiophosphite, tritolyl trithiophosphite, or S-methyl, S'-ethyl, S"-phenyl trithiophosphite, and the like.

The starting alcohols are preferably the aliphatic monohydroxy saturated alcohols having up to about 22 carbon atoms and preferably from about 1 to about 12 carbon atoms in the molecule. Illustrative alcohols are ethanol, pentanol, 2-ethylhexanol, dodecanol, 3-ethyl-2-pentanol, ethylene glycol monomethyl ether, ethylene glycol monoethyl ether, and the like.

The acrylic acid esters are produced by the inter-action of acetylene with carbon monoxide and an alcohol at elevated temperature and under increased pressure in the presence of a catalytic amount of the catalyst complex combination produced with a nickel halide and an organic trithiophosphite.

The reaction is successfully carried out with our catalyst complex at temperatures of from about 90° C. to about 250° C. or higher. Temperatures of from about 100° C. to about 200° C. are preferred. The reaction can be expedited by the use of slight pressures; and we prefer to work at pressures exceeding about 100 p.s.i.g., with pressures of from about 400 p.s.i.g. to about 500 p.s.i.g. most preferred. Higher pressures can, of course, be used with proper precautions.

The mole ratio of nickel halide to organic trithiophosphite can be varied over wide limits, and does not appear to be critical; nevertheless, we prefer to employ equimolar amounts of each component. The amount of catalyst complex charged to the reaction mixture is not critical, and can be varied over a wide range so long as a catalytic amount is present. When based on the alcohol charged, it has been found that a catalyst complex containing about 0.0622 mole each of the nickel halide and of the organic trithiophosphite per 16 moles of alcohol yields the highest conversions from an economical viewpoint. Higher concentrations of catalyst would give a faster reaction, but would require a greater expense in catalyst cost; while lower concentrations would be more economical as far as catalyst cost is concerned, but the productivity would suffer.

The reaction can be carried out in a batchwise or in a continuous manner by methods which are known to the art. The acetylene and carbon monoxide can be added separately, or for reasons of safety, as a mixture of gases, which mixture can be widely varied.

The following examples further serve to illustrate this invention. Parts are by weight unless otherwise specified.

Example 1

A three-liter stainless steel rocking autoclave was charged with 650 g. of ethanol, 22 g. of tribenzyl trithiophosphite [(C$_6$H$_5$CH$_2$S)$_3$P] and 12 g. of nickel bromide, sealed and purged with carbon monoxide and then with a 1:1 mixture, by volume, of acetylene and carbon monoxide. The autoclave was rocked and the pressure was increased to 40 p.s.i.g. by the further addition of the acetylene-carbon monoxide mixture. The gas addition was halted and the autoclave was heated to 100° C. at which time the pressure was increased 25 p.s.i.g. by the addition of acetylene. The total pressure was then increased to 300 p.s.i.g. with the acetylene-carbon monoxide mixture and heating continued to a temperature of 145° C. At this point the pressure was increased to 450 p.s.i.g., and maintained between 400 p.s.i.g. to 450 p.s.i.g. by the periodic addition of the acetylene-carbon monoxide mixture for 3.7 hours. During this period the temperature was maintained between 145° C. to 165° C. The reaction was stopped by cooling the autoclave with air and then releasing the pressure. The reaction mixture was filtered to remove solid materials, and the filtrate was distilled to separate the monomeric ethyl acrylate, most of which distilled as the ethyl acrylate-ethanol azeotrope, from the higher boiling acrylate esters and polymer-containing residue. The total yield of monomeric ethyl acrylate was 388 g.

In similar manner one produces the propyl or butyl esters by substituting the appropriate alcohol for ethanol.

Example 2

In a manner described in Example 1, 740 g. of ethanol was treated with acetylene and carbon monoxide at 149° C. to 171° C. in the presence of a complex combination of 13.6 g. of nickel bromide and 13.3 g. of triethyl trithiophosphite [(C$_2$H$_5$S)$_3$P] as catalyst. The yield of ethyl acrylate was about 95 g. as estimated from the amount of gas consumed.

What is claimed is:

1. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and an organic trithiophosphite selected from the group represented by the general formula:

wherein R, R' and R" represent an hydrocarbon radical selected from the group consisting of alkyl radicals, aryl radicals, aralkyl radicals and alkaryl radicals wherein the aryl portion of said radicals is selected from the group consisting of a phenyl and naphthyl radical.

2. In the manufacture of an acrylic acid ester by heating at a temperature between about 90° C. and about 250° C. and under a pressure exceeding 100 p.s.i.g. an aliphatic monohydroxy saturated alcohol having from 1 to about 12 carbon atoms with carbon monoxide and acetylene, the improvement which comprises carrying out the reaction in the presence of a catalyst complex combination of a nickel halide and an organic trithiophosphite selected from the group represented by the general formula:

wherein R, R' and R" represent a member selected from the group consisting of alkyl radicals, aryl radicals, aralkyl radicals and alkaryl radicals wherein the aryl portion of said radicals is selected from the group consisting of a phenyl and naphthyl radical.

3. A process as set forth in claim 2, wherein the nickel halide is nickel bromide.

4. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and $(C_2H_5S)_3P$.

5. In the manufacture of an acrylic acid ester by the inter-action of acetylene with carbon monoxide and an alcohol at elevated temperature and under increased pressure, the improvement which comprises carrying out the reaction in the presence of a catalyst complex combination of a nickel halide and $(C_6H_5CH_2S)_3P$.

References Cited in the file of this patent
UNITED STATES PATENTS 2,806,040     Reppe et al. _____ Sept. 10, 1957

FOREIGN PATENTS 805,641     Germany _____ May 25, 1951